United States Patent [19]

Hendrickson

[11] 4,325,567
[45] Apr. 20, 1982

[54] LOAD-LEVELING AIR PUMP

[75] Inventor: Richard T. Hendrickson, South Bend, Ind.

[73] Assignee: The Bendix Corporation, Southfield, Mich.

[21] Appl. No.: 85,087

[22] Filed: Oct. 15, 1979

[51] Int. Cl.³ .............................................. B60G 17/00
[52] U.S. Cl. .................. 280/711; 267/64.17; 280/DIG. 1
[58] Field of Search .............. 280/6 H, 6 R, 711, 712, 280/713, DIG. 1, 47; 180/41; 267/DIG. 1, DIG. 2, 65 D, 64 R, 64.17, 64.16

[56] References Cited

U.S. PATENT DOCUMENTS

| | | | |
|---|---|---|---|
| 2,323,204 | 6/1943 | Cross | 267/DIG. 1 |
| 2,571,449 | 10/1951 | Hobbs | 267/DIG. 2 |
| 2,918,273 | 12/1959 | Whisler | 267/65 D |
| 2,956,796 | 10/1960 | Devillers | 267/DIG. 2 |
| 2,987,310 | 6/1961 | Ord | 267/DIG. 2 |
| 3,021,153 | 2/1962 | Dickinson | 280/124 |
| 3,058,739 | 10/1962 | Dickinson | 280/6 H |
| 3,074,708 | 1/1963 | Lusit | 267/64 R |
| 3,079,171 | 2/1963 | Dickinson | 280/124 |
| 3,145,985 | 8/1964 | DeCardon | 280/711 |
| 3,179,401 | 4/1965 | Bartram et al. | 267/65 D |
| 3,331,599 | 7/1967 | Polhemus | 267/DIG. 2 |
| 3,409,286 | 11/1968 | Erdmann | 280/6 R |
| 3,540,716 | 11/1970 | Hahn | 267/64 R |
| 3,542,387 | 11/1970 | Schmid | 280/6 R |
| 3,649,044 | 3/1972 | Higginbotham | 267/65 D |
| 3,653,676 | 4/1972 | Higginbotham | 280/6 R |
| 3,790,146 | 2/1974 | Hoffmann | 267/DIG. 1 |
| 4,017,099 | 4/1977 | Hegel | 267/65 D |
| 4,200,269 | 4/1980 | Ludwig | 280/6 H |

*Primary Examiner*—David M. Mitchell
*Attorney, Agent, or Firm*—Paul David Schoenle; Ken C. Decker

[57] ABSTRACT

An automatic load-leveling pump is adapted for use with an air adjustable shock absorber to maintain a substantially constant vehicle height despite changes in vehicle loading. The pump includes a housing connected to the vehicle axle and a pump piston connected to the vehicle frame. A feedback device slides within the housing in response to air pressure and includes a cylinder, which, together with the pump piston, encloses a compression chamber. The feedback device moves in response to air pressure to control the compression ratio of the compression chamber.

1 Claim, 5 Drawing Figures

LOAD-LEVELING AIR PUMP

BACKGROUND OF THE INVENTION

This invention relates to an automatic load-leveling pump for use in combination with conventional air adjustable shock absorbers or air bags.

Currently, automotive vehicles are available with either air or hydraulic automatic load-leveling systems. An automatic system, such as is disclosed in U.S. Pat. No. 4,017,099, uses conventional air shocks with an electrically powered air compressor to extend the shocks and electronic height sensing to control the amount of air pumped into the shocks by the compressor. Such systems are complex, costly and they constitute a power drain on the vehicle electrical system. Hydraulic load-leveling systems, such as are disclosed in U.S. Pat. Nos. 3,653,676 and 3,649,044, use engine-driven or electric motor-driven hydraulic pumps to pump hydraulic fluid into the rear shocks. Because of the incompressibility of the hydraulic fluid a separate gas accumulator or a gas-filled shock is necessary to soften the ride characteristic. Mechanical height sensing controls the amount of fluid pumped into the shocks. Also available are self-pumping load-leveling shock absorbers whose pumping action is powered by the relative motion of the vehicle frame and axle. Such self-pumping shocks are complex and costly and suffer from reduced pumping efficiency as the shock absorber is extended.

SUMMARY OF THE INVENTION

An advantage of this invention is that is provides a simple and inexpensive automatic load-leveling mechanism for use with conventional air adjustable shock absorbers.

Another advantage of this invention is that it provides a pump mechanism powered by relative motion of a vehicle frame and axle for an automatic load-leveling system.

Another advantage of this invention is that a load-leveling pump is provided with a compression ratio which does not deteriorate as the separation of the frame and axle increases.

Finally, an advantage of this invention is that it provides an air load leveling pump with mechanical height sensing for automatic load leveling.

These advantages are achieved by the present invention which provides an automatic load-leveling air pump for use with an air adjustable shock absorber. The pump includes a housing connected to a vehicle axle and a pump piston connected to the vehicle frame. A feedback piston slides in the housing in response to air pressure and is attached to a cylinder within which the pump piston reciprocates. The pump piston and the cylinder together enclose a compression chamber from which air is transferred to the air adjustable shock. The feedback piston and the cylinder move in the housing in response to increasing shock absorber pressure to increase the compression ratio of the pump. A mechanical height sensing valve cooperates with the pump to maintain a substantially constant average separation between the frame and axle despite changes in vehicle loading.

DETAILED DESCRIPTION

Figures 1, 2, 3:
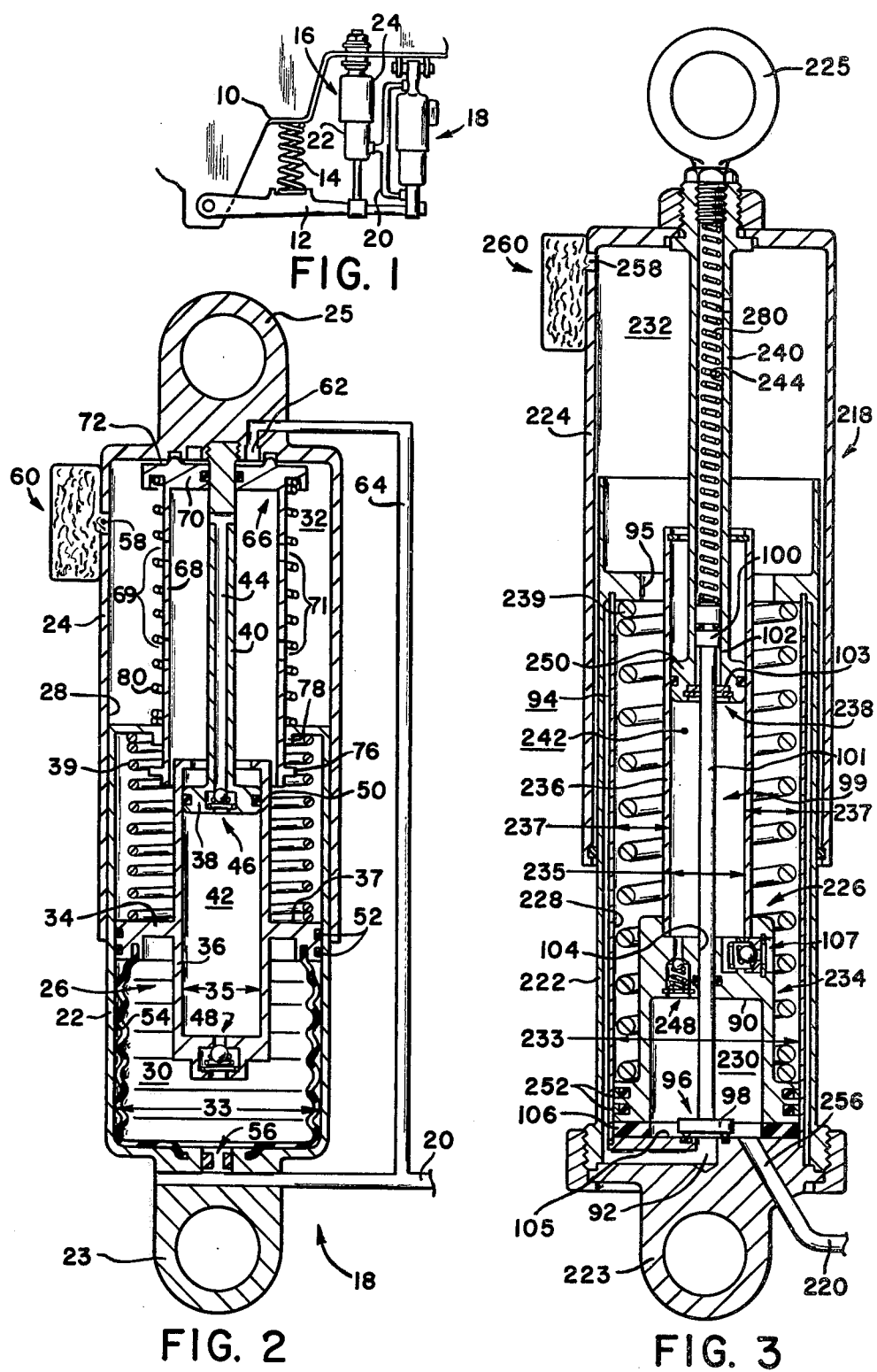
FIG. 1 is a view of a vehicle suspension system including a load-leveling mechanism made pursuant to the teaching of the present invention.
FIG. 2, is a longitudinal sectional view of one embodiment of a load-leveling pump used in the load-leveling mechanism illustrated in FIG. 1.
FIGS. 3, 4, and 5 are views similar to FIG. 2, but illustrating alternate embodiments of applicant's invention.

As shown in FIG. 1, an automotive vehicle includes a sprung mass or frame 10 pivotally supported from an unsprung mass or axle 12 by springs 14. An air adjustable shock absorber 16 is attached between the frame and the axle. Automatic load-leveling pump 18 is also attached between the frame 10 and axle 12 adjacent the shock absorber 16. Pump 18 includes inner and outer housing portions 22 and 24 connected to the axle 12 and to the frame 10, respectively. Connecting line 20 communicates air between pump 18 and the shock absorber 16.

Referring now to the embodiment of FIG. 2, pump 18 includes an inner housing portion 22 with a fitting 23 for connecting to the axle (not shown). Outer housing portion 24 includes a fitting 25 for connecting to the frame (not shown) and slidably receives inner housing portion 22. Inner housing portion 22 defines a bore 28 within which a feedback device 26 is sealingly and slidably mounted. Feedback device 26 divides pump 18 into outlet chamber 30 and inlet chamber 32. Feedback device 26 includes an integral piston portion 34 and a hollow cylindrical portion 36. Piston 38 is slidably and sealingly received by the cylinder 36. Rod 40 connects pump piston 38 to frame 10 and to outer housing portion 24. Piston 38 and cylinder 36 define compression chamber 42.

Feedback device 26 includes a first area on piston 34 with a diameter 33 exposed to air pressure in the outlet chamber 30 and in the shock absorber (not shown), a second area with a diameter 35 exposed to air pressure in compression chamber 42 and a third area 37 equivalent to the first area less the second area exposed to reservoir or atmospheric air pressure. Because the inside diameter 35 of cylinder 36 is smaller than the inside diameter 33 of bore 28, the first area is larger than either of the second or third areas. Spring 39 engages inner housing portion 22 and piston portion 34 of feedback device 26 and urges feedback device 26 so as to resist enlargement of outlet chamber 30.

Rod 40 includes a passage 44 for communicating air from inlet chamber 32 to compression chamber 42. Check valve 46 permits oneway communication of air from inlet chamber 32 to compression chamber 42 and check valve 48 permits oneway air communication from chamber 42 to outlet chamber 30. O-ring seal 50 forms a seal between piston 38 and cylinder 36. O-ring seals 52 form seals between diaphragm 34 and inner housing 22. Rubber boot 54 has ends connected to diaphragm 34 and inner housing 22 to prevent the escape of shock absorber pressure from outlet chamber 30 to inlet chamber 32.

Outlet 56 connects outlet chamber 30 to the shock absorber (not shown) via line 20. Inlet 58 connects a fluid reservoir or the atmosphere with inlet chamber 32. A dryer and filter element 60 surrounds inlet 58 and protects the interior of pump 18 from the environment. Control passage 62 communicates inlet chamber 32 with the shock absorber (not shown) and outlet chamber 30 via line 64 and line 20. Valve member 66 is slidably mounted on rod 40 and consists of a cylindrical body 68 with a disc-shaped sealing member 70 at one end thereof. Ports 69, 71, in body 68 allow free air communication from inlet chamber 32 to rod passage 44, and thus, to compression chamber 42. The outer face 72 of sealing member 70 is adapted to form a seal against outer housing portion 24 around control passage 62 to prevent air communication between control passage 62 and inlet chamber 32. Annular abutment 76 on cylindrical body 68 is capable of engaging annular abutment 78 on inner housing portion 22. Spring 80 engages sealing member 70 and abutment 78 and urges sealing member 70 toward sealing engagement with outer housing 24 to block communication through control passage 62.

Another embodiment of applicant's invention is illustrated in FIG. 3. FIG. 3 reference numerals for elements similar to those of FIG. 2 are obtained by adding 200 to the reference numerals of FIG. 2. The embodiment illustrated in FIG. 3 is similar to the embodiment of FIG. 2, except as follows: The piston 234 includes a recess 90 which defines a portion of the outlet chamber 230. Inner housing portion 222 includes a control passage 92 for communication with outlet chamber 230. Inner housing portion 222 has a double-walled construction and the annular space between the walls forms passage 94 which communicates control port 92 with inlet chamber 232 via opening 95. Valve member 96 includes a sealing member 98 and a vave rod 99 with larger diameter portion 100 and smaller diameter portion 101 which cooperate to form an abutment 102. Larger diameter portion 100 is slidably received in bore 244 of piston rod 240. Abutment 102 is engageable with abutment 103 on piston 238 to pull sealing member 98 away from sealing engagement around control port 92 upon at least a predetermined separation of the frame and axle (not shown). Portion 101 of valve rod 99 extends from portion 100, past abutment 103, through compression chamber 242, through bore 104 in piston 234, into outlet chamber 230 to sealing member 98. Bumper member 106 is disposed between piston 234 and end 105 of inner housing portion 222. The recess 90 allows sealing member 98 to be pulled away from housing end 105 when piston 234 engages bumper 106. Valve spring 280 prevents sealing member 98 from being pulled away from housing end 105 to open control port 92 to outlet chamber 230 until at least a predetermined separation of the frame from the axle (not shown) occurs. Feedback device 226 also includes inlet check valve 107 which permits air communication from inlet chamber 232 into compression chamber 242 on the upstroke of piston 238.

Figures 4, 5:
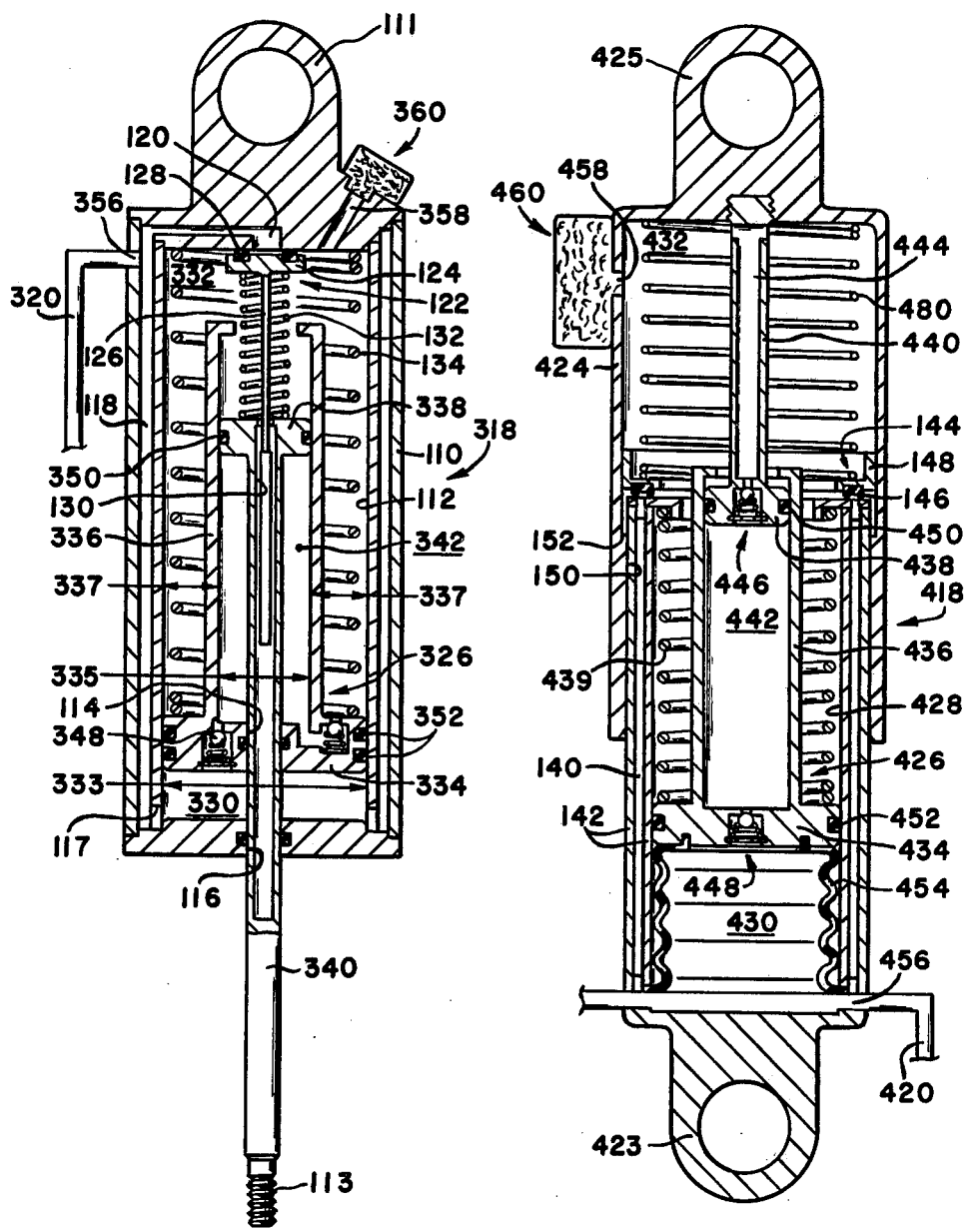

A third embodiment of applicant's load leveling pump is shown in FIG. 4 with reference numerals for elements similar to those in FIG. 2 obtained by adding 300 to the FIG. 2 reference numerals. In the FIG. 4 embodiment housing 110 includes a fitting 111 for connecting to the frame (not shown). Pump piston 338 is connected to axle 312 (not shown) by fitting 113. Bore 112 in housing 110 slidably and sealingly receives feedback device 326. Rod 340 extends from piston 338 through compression chamber 342, through bore 114 in piston 334 and through bore 116 in housing 110. A space between a double walled portion of the housing 110 forms a passage 118 which communicates with the outlet chamber 330 via passage 117. Control port 120 communicates passage 118 with the inlet chamber 332. Control valve member 122 includes sealing member 124 and a rod 126 with seal 128, mounted on the end of sealing member 124. Bore 130 extends through piston 338 and into piston rod 340 and slidably receives valve rod 126. Valve spring 132 holds the sealing member 124 in position to prevent communication of air from control port 120 into inlet chamber 332 unless the frame (not shown) and axle (not shown) are separated by a predetermined amount. Spring 134 exerts a force upon feedback device 326 which opposes the force resulting from the pressure in outlet chamber 330 acting on piston 334.

A fourth embodiment is illustrated in FIG. 5 with reference numerals obtained by adding 400 to analogous reference numerals of FIG. 2. In the fourth embodiment control passage 140 is formed by the space between the double walls of inner housing portion 142. Control passage 140 communicates outlet chamber 430 and passages 456 and 420 with inlet chamber 432. Valve member 144 includes sealing member 146, which is adapted to seal control passage 140 from inlet chamber 32. Sealing member 146 is mounted on an annular flange-shaped support member 148. Support member 148 is slidably mounted on the inner surface 428 of outer housing portion 424. Housing portion 424 includes a smaller inside diameter portion 150 which forms an abutment 152 for engaging valve member 144 upon at least a predetermined separation of the frame 410 and axle 412.

MODE OF OPERATION

Referring to FIGS. 1 and 2, the frame 10 and axle 12 of an automotive vehicle at rest can be described as having a neutral or average separation, the amount of which depends upon the weight or load supported by the frame 10, the stiffness of the springs 14 and the amount of air in the air adjustable shock absorber 16. The motion of the vehicle over an uneven road surface causes the instantaneous separation of the frame 10 and axle 12 to vary in an oscillatory manner about this neutral separation. The pump mechanism 18, operates to control the amount of air in the shock absorber bag 16 to maintain a substantially constant neutral separation between the frame 10 and axle 12, regardless of changes in the amount of load carried by the frame 10.

Pumps 18, 218, and 418, illustrated in FIGS. 2, 3, and 5, respectively, operate to pump air to the shock absorber 16 as the frames 10, 210, and 410, and the axles 12, 212, and 412, move toward each other. Referring again to FIGS. 1 and 2, assume that the vehicle is in an unloaded condition such that the housing portions 24 and 22 connected to the frame 10 and axle 12 have an initial neutral separation as shown. With this separation, the control passage 62 is sealed from inlet chamber 32 by control valve member 66 to prevent air escaping from shock absorber 16 so that the initial neutral separation is maintained.

Now, if the vehicle is driven over an uneven road surface, the frame 10 and axle 12, and thus the outer 24 and inner 22 housing portions will move relative to one another and oscillate about the initial neutral separation. On the half cycle of the oscillation during which the pump 18 is compressed, the piston 38 is on the downstroke and air is compressed in compression chamber 42. The air in chamber 42 is forced through check valve 48 into outlet chamber 30, and through outlet 56 and line 20 to the shock absorber 16. This increases the air pressure in shock absorber 16 and in outlet chamber 30.

The diameters 33, 35, and 37 are chosen so that the air pressure in outlet chamber 30 resists movement of feedback device 26 in response to the downstroke or compression stroke of piston 38 until the air pressure in compression chamber 42 is sufficient so that air may be transferred from compression chamber 42, through check valve 48 and into outlet chamber 30.

On the other half cycle of the oscillation, the frame 10 moves away from the axle 12 and the pump 18 is extended as the piston 38 moves upwardly viewing FIG. 2. As piston 38 moves on the upstroke, check valve 48 closes to prevent air from escaping from the outlet chamber 30. At the same time check valve 46 opens to permit a new supply of air to enter into compression chamber 42 to be compressed and pumped to the air adjustable shock absorber 16 on the next piston downstroke. As piston 38 continues on the upstroke, the inner and outer housing portions 22 and 24 move further apart than the neutral separation shown in FIG. 2, and a point is reached where abutment 76 on sleeve 68 of control valve member 66 engages abutment 78 of inner housing portion 22. Continued extension of pump 18 then causes sealing member 70 to be pulled away from sealing engagement with the outer housing portion 24 around control passage 62, thus allowing air to escape from shock absorber 16 via lines 20, 64 and control passage 62 to inlet chamber 32, and thus to atmosphere via inlet 58. Assuming that the amount of air pumped into shock absorber 16 on the downstroke is substantially the same as that lost from the shock absorber 16 on the pump upstroke, the frame 10 and axle 12 will continue to oscillate substantially about this initial neutral position until the vehicle stops or the vehicle load is changed.

If more load is added to the vehicle, such as when additional passengers are carried, the frame 10 moves down toward the axle 12 to a smaller neutral separation until the increased load is balanced by the tension of spring 14 and by the resistance of the air adjustable shock absorber 16. Now when the loaded vehicle moves over an uneven road surface the frame 10 and axle 12 oscillate about this smaller neutral separation. On the downstroke of the oscillation, the piston 38 compresses air in compression chamber 42 and pumps air to shock absorber 16 just as it did in the unloaded condition previously described. On the pump piston 38 upstroke check valve 48 again closes, check valve 46 opens, and air enters compression chamber 42 from inlet chamber 32 in preparation for the next downstroke. However, in this loaded condition, the separation of frame 10 from axle 12 may be such that sealing member 70 of valve member 66 is not pulled away from sealing engagement around control passage 62 by the engagement of abutments 76 and 78 as soon during the piston upstroke as during the piston upstroke in the unloaded condition. As a result, in the loaded condition more air is pumped into shock absorber 16 during compression of pump 18 than is lost from shock absorber 16 during extension of pump 18. Because of this, each full oscillation of pump 18 results in a net increase in the amount of air in shock absorber 16 and a net increase in the air pressure in shock absorber 16 and outlet chamber 30. The increased air pressure in the air adjustable shock absorber 16 increases the neutral separation of the frame 10 and axle 12. At the same time, this increased air pressure acts in outlet chamber 30 upon area 33 of piston 34 to move feedback device 26 upward in inner housing 22 until the increased pressure in outlet chamber 30 is balanced by the resistance of spring 39. Thus, as the neutral separation of frame 10 and axle 12 increase, the feedback device 26 moves upward viewing FIG. 2 and away from axle 12.

The compression ratio of pump 18 may be defined as the ratio of the maximum volume to the minimum volume of the compression chamber 42 as the position of pump piston 38 varies relative to cylinder 36 of feedback device 26. The maximum volume occurs when piston 38 is at the limit of its upstroke during extension of pump 18. The minimum volume occurs when piston 38 is at the limit of its downstroke during compression of pump 18. It should be noted that if feedback device 26 were fixed to inner housing 22, or if compression chamber 42 was otherwise enclosed by structure which was fixed relative to the axle 12, then both the maximum and minimum volumes of the compression chamber 42 would be increased by an identical amount as the neutral separation of the frame 10 and axle 12 increases, assuming pump oscillations of substantially constant amplitude. The compression ratio would therefore be decreased for increasing frame 10 and axle 12 separation since the compression ratio would be the ratio of the increased maximum volume to the increased minimum volume. Such a pump would therefore have an efficiency which would deteriorate upon increasing neutral separation of the frame 10 and axle 12. However, in the instant invention, the feedback device 26 moves upwardly viewing FIG. 2 in response to increasing pressure in outlet chamber 30 to thereby lessen the amount by which the maximum and minimum volumes of compression chamber are increased due to the increasing neutral separation of the frame 10 and axle 12. In this manner, the compression ratio and the pumping efficiency of applicant's pump 18 does not deteriorate or vary as would the compression ratio and pumping efficiency of a pump with a compression chamber fixed to the axle 12. In fact, because the area of feedback device 26 which is exposed to outlet chamber pressure is larger than the area which is exposed to compression chamber pressure, the feedback device 26 moves upward, viewing FIG. 2, in response to increasing pressure in outlet chamber 30, a distance which is larger than the change in the neutral separation corresponding to this increased outlet chamber pressure. This permits pump 18 to continue efficiently pumping air to the air adjustable shock absorber 16 as the neutral separation of the frame 10 and axle 12 increases.

As the pump 18 continues to pump air into shock absorber 16 in response to the oscillatory frame 10 and axle 12 movement, the neutral separation of the frame 10 and axle 12 continues to increase until control passage 62 is opened to inlet chamber 32 on the upstroke of piston 38 as previously described. Thereafter, the shock absorber pressure and the neutral separation continues to increase during the oscillatory frame and axle motion until the amount of air lost from the shock absorber 16 on the extension of pump 18 equals the amount of air gained by the shock absorber 16 on the compression of pump 18. At this point, a final or loaded neutral separation is attained and the frame 10 and axle 12 continue to oscillate about this final neutral separation until once again the vehicle load is changed. If, after a stable neutral separation is attained, the vehicle load is decreased, then the neutral separation of the frame 10 and axle 317 will increase. In this case, if the separation of the frame 10 and axle 12 is larger than the predetermined separation, valve member 66 will open control port 62 to reduce the shock absorber pressure to allow the frame 10 and axle 12 separation to decrease until the separation is just under the predetermined separation. If the unloaded vehicle is moving and the frame 10 and axle 12 are oscillating, then there will be a net decrease in the shock absorber pressure for each full oscillation cycle until a new stable neutral separation is attained wherein there is zero net air loss or air gain for the shock absorber 16 for each full oscillation cycle of the pump 18. As the neutral separation decreases, and as the air pressure in outlet chamber 30 decreases, feedback spring 39 urges the feedback device 26 toward the axle 12, resulting in a lower pump compression ratio corresponding to the decreased load carried by the vehicle.

The load leveling pumps 218 and 418 illustrated in FIGS. 3 and 5 operate in the same manner as pump 18 of FIG. 2. The only difference being that control valves 96, 144 and control passages 90, 140 of pump 218 and 418, respectively, perform the height control function performed by control valve 66 and control passage 62 of pump 18.

The operation of load leveling pump 318, illustrated in FIG. 4, differs from that of the previous embodiments in that piston 338 compresses air in compression chamber 342 to pump air into outlet chamber 330 and into air adjustable shock absorber 16 as the frame 310 and axle 312 move away from one another. This permits the pump 318 to pump air into shock absorber when the shock absorber is being extended and thus when the air pressure in shock absorber is decreasing rather than increasing as in the previous embodiments wherein air is pumped into the shock absorber during shock absorber compression.

I claim:

1. In a vehicle having an unsprung mass, a sprung mass supported from the unsprung mass, and a fluid-receiving device for controlling the relative position of said masses, said masses having a variable neutral separation depending upon the amount of fluid within said fluid-receiving device and upon the weight of the sprung mass, a fluid pump for pumping fluid into said fluid-receiving device and powered by the relative motion of said masses in response to vehicle movement, said pump comprising:

a first housing portion fixedly connected to one of said masses, pressure-responsive means slidably and sealingly received by said first housing portion and a pump piston fixedly connected to the other of said masses and slidably and sealingly received by said pressure-responsive means, said pump piston and said pressure-responsive means cooperating to define a compression chamber therebetween, said pump piston moving relative to said pressure-responsive means to transfer fluid from said compression chamber into said fluid-receiving device, and said pressure-responsive means being movable in response to increasing fluid pressure in said fluid-receiving device to decrease the volume of said compression chamber so that the amount of fluid transfered to said fluid receiving device varies in response to the fluid contained therein.

* * * * *